Oct. 21, 1941.  S. VERNET ET AL  2,259,846

TEMPERATURE RESPONSIVE ELEMENT

Filed June 17, 1937

INVENTORS
Sergius Vernet
Joseph Kim
Joseph Lee Leiserson
BY Andrew K. Foulds ATTORNEY Patented Oct. 21, 1941

2,259,846

UNITED STATES PATENT OFFICE 2,259,846

TEMPERATURE RESPONSIVE ELEMENT

Sergius Vernet, Joseph Kim, and Joseph Lee Leiserson, Yellow Springs, Ohio, assignors to Vernay Patents Company, Yellow Springs, Ohio, a corporation of Delaware Application June 17, 1937, Serial No. 148,658

9 Claims. (Cl. 297—3)

Our invention relates to a new and useful element or body which is expansible and contractible on changes of temperature to which it is exposed and also relates to the method of making the element and compounding the material which comprises the same.

One object of our invention is to provide a thermostatic material which is plastic and can be readily formed into an element of desired shape.

Another object is to provide a formed element having a consistent response to predetermined changes of temperature.

Another object is to provide a solid elastic body formed of a composition of materials which will respond quickly to changes in temperature to which it is subjected.

Another object is to provide a novel composition of matter having a high degree of expansion and contraction on temperature change.

The foregoing and other objects will be apparent from the following description of the element, the material comprising the same and the definition of the steps of the process.

In the accompanying drawing to be taken as a part of this specification, we have fully and clearly illustrated a preferred embodiment of our invention, in which drawing—

Figure 1:
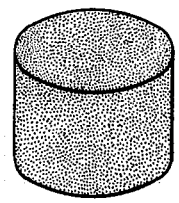
Figure 2:
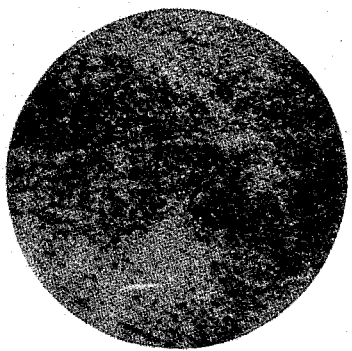
Figure 3:
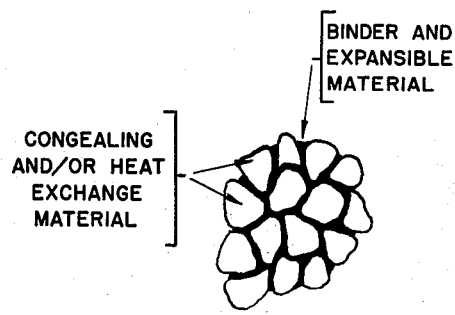

Figure 1 is a view in perspective of a thermostatic power generating element of pellet form showing our invention, Fig. 2 is a photo-micrograph of an end face of a pellet, and Fig. 3 is a greatly enlarged diagrammatic detail view of a portion of the pellet surface shown in Fig. 2.

A material is chosen to serve as the motive or power agent which will expand or contract on change of temperature and which is of such fusible crystalline character that when combined with other materials it will undergo its change of state in the desired temperature range of operation of the thermostatic element or body. It should also be a material which will go into solution with or is somewhat mutually soluble with another or other materials serving as a binder, to be described, so that the solution can be distributed as a thin film. Motive agent materials of this nature are diphenyl, dibromobenzene, dichlorobenzene, and other substances which experience a volumetric change over their fusion range. A satisfactory motive material for an element or body having the major portion of its expansion occurring between about 150° F. and 160° F., is diphenyl, whereas for a range of 180° F. to 190° F., dibromobenzene may be used. The particular crystalline material which is chosen is then heated, preferably in a closed or covered container, until it is all in liquid or molten state.

The binder material, which is either wholly or partially soluble or which forms a colloidal solution with the operable crpstalline material, imparting cohesive and somewhat elastic properties to the solution and also increasing its viscosity, is now added to the molten motive crystalline material. The most satisfactory carrier materials we have so far found are unsaturated hydrocarbon polymers, and vinyl chloride polymers are particularly suitable. While the binder material is being dissolved in the molten material, a temperature above the fusion temperature of the crystalline material must of course be maintained. When the binder material chosen is vinyl chloride polymer, the temperature is preferably maintained at about 195° F. However, care must be taken that the temperature is not so high as to cause a break down of the binder substance. It is also desirable during this time that the molten material should be agitated or stirred in order to throughly mix and blend the materials and to increase the rate of dissolving of the binder material. Suitable proportions by weight of the fusible material and the carrier material when, for example, they are vinyl chloride polymer and diphenyl, may be about 11% to 14% of the polymer and 86% to 89% of diphenyl or sufficient diphenyl to make up 100% although the proportions are not critical.

When the binder material has been completely dissolved in the fusible molten material, the solution may be permitted to cool and congeal to a solid mass and be stored in closed containers. However, as the further steps in the process require the solution to be fluid, it is preferably not permitted to congeal which would require it to be again heated and melted. The hot liquid solution now has added thereto a finely divided solid material which will not undergo a change of state within the operating range of the element or body, the solution having such a viscosity due to the binder material that the finely divided material will not precipitate from the mixture at normal operating temperatures of the thermostatic element and when the crystalline and binder materials fuse. This solid material is distributed uniformly through the solution which is preferably accomplished by stirring the solution as the solid material is gradually supplied thereto. The finely divided material may be heated before being added to the solution so as not to chill the same and a sufficient quantity is added to cause the solution to congeal and lose its fluidity while hot, but preferably not more than can have all of its particles covered with a film of or coated by the solution. The finely divided material may be in flaked, granulated or powdered state and is preferably, though not necessarily, a good conductor of heat. Such solid materials as graphite, carbon, antimony, aluminum, copper and combinations of these materials may, for example, be used. However, we have found that copper in flaked or powdered form is eminently satisfactory. When the materials in solution are, for example, vinyl chloride polymer and diphenyl, and the solid finely divided material is copper, the proportions by weight which will cause the solution to congeal while hot are about 80% of copper to about 20% of solution.

This mixture of the finely divided solid, the fusible or crystalline and the binder materials forms a plastic, elastic mass of thermostatic material which will, after a short time, experience or undergo a vulcanizing-like process or a change very similar to vulcanization which increases or enhances the elastic quality of the material. In order to assure successively uniform responsiveness of the material to temperature change, it is desirable before this vulcanizing-like change occurs to form the material under pressure into a body or element of desired shape. The congealed plastic mass is therefore subdivided or ground up into particles of predetermined size, preferably to 60 mesh plus fines. A quantity of the ground-up mass or mixture is then placed in a die or a form of the desired contour, to provide for example, a block or pellet of cylindrical shape. The material in the die is then compressed or squeezed into a compact body or element. The pressure exerted by the piston or other compressing means cooperating with the die must be sufficient to eliminate any voids and to discharge or squeeze out any trapped air or gas and to inhibit growth. Should the piston pressure not be great enough, the formed element may swell or crack during use, thus destroying its value. When an element of cylindrical form is made from say 13 grams of the ground-up mass, a pressure of 11,000 pounds per square inch at a piston speed of 22 inches per minute may, for example, be employed. This high pressure reunites the mass particles into a solid homogeneous body or element which is bound together by the binder material.

Our novel temperature responsive element or body is particularly adapted for use in a sealed chamber having a movable wall portion or piston which is actuated by a medium or liquid in contact with and operable to transmit the expansive force of the element or body.

What we claim and desire to secure by Letters Patent of the United States is:

1. A thermostatic expansible-contractible power generating element including crystalline material and an elastic binder material in solution, said crystalline material being expansible on fusion and being fusible in the operating range of the thermostatic element, and a finely divided material solid in the operating range of the thermostatic element and having its particles thickly dispersed through and coated with the solution so that the multiplicity of particles are bound together by said elastic material into a solid body.

2. A thermostatic power generating element for actuating a movable member comprising a compact expansible-contractible body including crystalline material, elastic binder material and finely divided heat conducting material, said crystalline material being in solution with said binder material and being expansible on fusion in the operating range of the thermostatic element, said heat-conducting material being solid throughout the operating range of the thermostatic element and having its particles thickly dispersed through and coated with the solution so that the multiplicity of particles are bound together by said elastic binder material into a solid body.

3. A thermostatic power generating element for actuating a movable member comprising a compressed expansible-contractible body including crystalline material, vinyl chloride polymer and finely divided metallic heat conducting material, said crystalline material being in solution with said polymer and being expansible on fusion in the operating range of the element, said metallic material being solid throughout the operating range of the element and having its particles coated with the solution and bound together by said polymer.

4. A thermostatic power generating element comprising a compressed expansible-contractible body including from 2 to 3 per cent by weight of vinyl chloride polymer, from 17 to 18 per cent by weight of a crystalline material expansible on fusion in the operating range of the element, and the per cent balance by weight being of finely divided metallic material, the polymer and the crystalline material being in solution and coating and binding together the particles of the divided material.

5. A thermostatic power generating element comprising a crystalline material expansible on fusion and fusible in the operating temperature range of the element, a binder material in solution with said crystalline material, a finely divided solid heat conducting material dispersed through said solution and being solid in the operating range of said element, said binder material being so proportioned to said crystalline material as to provide a solution of such viscosity that the finely divided material is held in suspension in said operating range upon fusion of said crystalline material.

6. A thermostatic power generating element comprising a crystalline material expansible on fusion and fusible in the operating temperature range of the element, a binder material in solution with said crystalline material, a finely divided solid heat conducting material having a multiplicity of minute particles dispersed through said solution and being solid in the operating range of said element, said binder material having such elasticity in the operating range of said element that said heat conducting material is held compactly together for uniform expansion of the element in said operating range, said solid material being so proportioned to said crystalline and said binder materials as to cause the same when fused to congeal.

7. A thermostatic power generating element for actuating a control device and having a predetermined range of operation, comprising a body of solid heat conducting material in finely divided state, the particles of material being solid in said operating range, and temperature responsive power generating crystalline material and a binder material in solution and filling the interstices of said body, so as to hold said body compactly together upon response of said power generating material.

8. A thermostatic pellet for generating power by expansion to operate a movable element, comprising a body of finely divided metal particles, a binder material and a crystalline expansible operating material filling the interstices between said particles, said particles comprising the major portion by volume of the pellet, and said binder material holding said body compactly together upon expansion of said operating material.

9. A thermostatic power generating element for actuating a control device and having a predetermined range of operation, comprising a compact integral mass of solid heat-conducting material and of material acting as a binder and responsive to temperature for power generation, said conducting material being in finely divided state and having its particles solid in said operating range, said second-named material being a solid at temperatures below said operating range and completely filling the voids between the particles of said conducting material, the second-named material holding the finely divided material in suspension in said operating range and having at least a portion thereof fusible in said operating range thereby to generate power.

SERGIUS VERNET.
JOSEPH KIM.
JOSEPH LEE LEISERSON.